United States Patent
Kito et al.

[11] Patent Number: 5,842,128
[45] Date of Patent: Nov. 24, 1998

[54] MOBILE COMMUNICATION SYSTEM WHEREIN A BASE STATION TRANSFERS TO ANOTHER AN IDENTIFIER FOR A CELL OF CALL ORIGINATION ONLY UPON CALL TERMINATION

[75] Inventors: Eiji Kito; Nobuyuki Takasawa, both of Tokyo, Japan

[73] Assignee: NEC Corporation, Tokyo, Japan

[21] Appl. No.: 438,189

[22] Filed: May 9, 1995

Related U.S. Application Data

[63] Continuation of Ser. No. 898,710, Jun. 15, 1992.

[30] Foreign Application Priority Data

Jun. 26, 1991 [JP] Japan .................................... 3-183207
Aug. 30, 1991 [JP] Japan .................................... 3-219500

[51] Int. Cl.$^6$ ..................................................... H04Q 7/22
[52] U.S. Cl. .......................... 455/435; 455/432; 455/524
[58] Field of Search .................................. 455/33.1, 33.2, 455/33.4, 54.1, 56.1, 54.2, 435, 432.3, 517, 524, 936.9; 379/59, 60, 63

[56] References Cited

U.S. PATENT DOCUMENTS

| | | | |
|---|---|---|---|
| 4,025,853 | 5/1977 | Addeo | 325/55 |
| 4,775,999 | 10/1988 | Williams | 455/33.2 X |
| 5,003,629 | 3/1991 | Ness-Cohn et al. | 455/56.1 X |
| 5,008,925 | 4/1991 | Pireh | 379/60 |
| 5,101,500 | 3/1992 | Marui | 455/33.1 X |
| 5,101,501 | 3/1992 | Gilhousen et al. | 455/56.1 X |
| 5,210,787 | 5/1993 | Hayes et al. | 455/33.2 |
| 5,212,822 | 5/1993 | Fukumine et al. | 455/33.1 |
| 5,305,644 | 4/1994 | Taketsugu | 455/33.1 |

FOREIGN PATENT DOCUMENTS

| | | | |
|---|---|---|---|
| 0338834 | 10/1989 | European Pat. Off. | 455/54.1 |
| 2243976 | 11/1991 | United Kingdom | 455/33.4 |

*Primary Examiner*—Wellington Chin
*Assistant Examiner*—Philip J. Sobutka
*Attorney, Agent, or Firm*—Foley & Lardner

[57] ABSTRACT

When a mobile unit (21(p)) initiates a call for communication in a first cell of a first cell set identified in an overall service area of base stations or cell sites by a first area identifier and moves into a second cell of a second cell set identified by a second area identifier, the first area identifier is transferred (S3(n1)) from a first station (17(n1)) corresponding to the first cell to a second station (17(n2)) corresponding to the second cell. When the unit terminates the communication while present in the second cell, the second area identifier is transmitted (S3(n2)) to a central office (11) and to the unit if the second area identifier is judged (S2(n2)) different from the first area identifier. Each station therefore comprises a transferring and a transmitting arrangement. Preferably, a channel disconnection signal (43) carries such a second area identifier. The communication can be terminated at a counterpart unit.

25 Claims, 4 Drawing Sheets

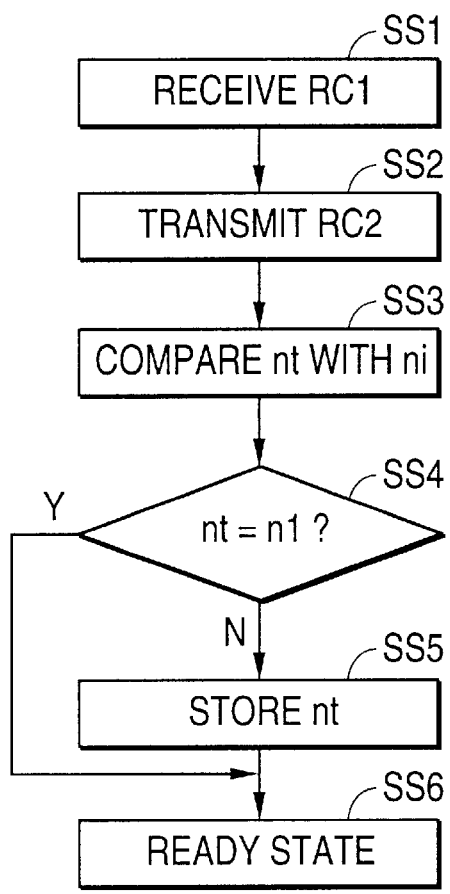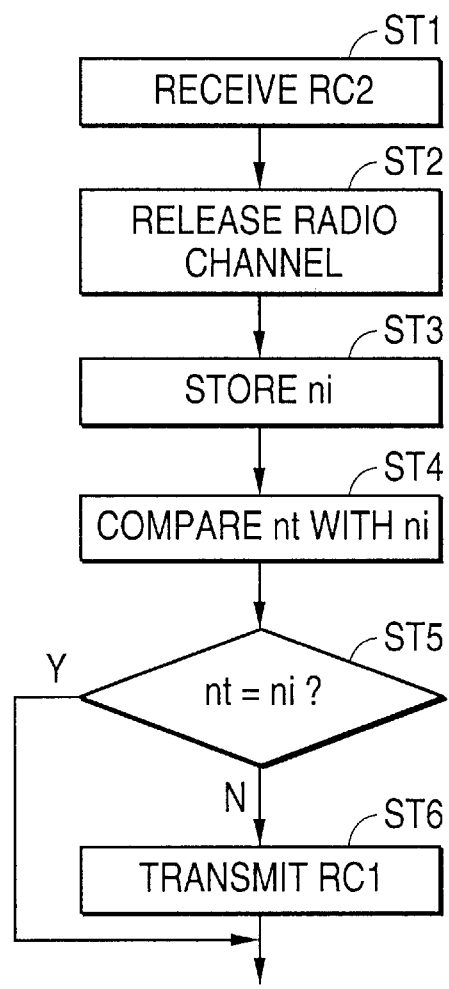

MOBILE COMMUNICATION SYSTEM WHEREIN A BASE STATION TRANSFERS TO ANOTHER AN IDENTIFIER FOR A CELL OF CALL ORIGINATION ONLY UPON CALL TERMINATION

This application is a Continuation of application Ser. No. 07/898,710, filed Jun. 15, 1992.

BACKGROUND OF THE INVENTION

This invention relates to a mobile communication system or network which may either be a mobile telephone and/or data telecommunication system or be a portable telephone system.

In the manner which will later be described more in detail, such a mobile communication system comprises a central office or station, a plurality of base stations or cell sites connected to the central office through wired and/or radio communication channels and collectively having an overall service area, and a plurality of mobile units or substations movable in the service area. The overall service area is divided into cell sets or position register areas which are identified by respective area identifiers and each of which is subdivided into at least one cell or radio communication zone. The cells of the cell sets are in one-to-one correspondence to the base stations. One of the mobile units will be taken into consideration and will be called a particular unit. The particular unit carries out communication with one of the base stations while present in one of the last-mentioned cells that corresponds to the above-mentioned one base station. Each of the central office, the base stations, and the mobile units comprises a transmitter/receiver and a memory connected to the transmitter/receiver.

It will be presumed that the particular unit initiates a call for communication while present in a first cell of the last-mentioned cells and terminates the communication while present in a second cell of the last-mentioned cells. It will furthermore be presumed that the first cell is in the cell set identified by a first identifier of the area identifiers and corresponds to a particular station of the base stations and that the second cell is in the cell set identified by a second identifier of the area identifiers and corresponds to a different station of the base stations.

In a conventional mobile communication system, the transmitter/receiver of the particular unit receives the first identifier from the particular station and stores the first identifier in the memory of the particular unit as a stored identifier. When the communication is terminated while the particular unit is present in the second cell, the transmitter/receiver receives the second identifier from the different station as a received identifier. With a predetermined interval of time, the transmitter/receiver compares the received identifier with the stored identifier to judge whether or not the received identifier is different from the stored identifier. If the received identifier is different from the stored identifier, the transmitter/receiver transmits the received identifier to the central office. The transmitter/receiver of the central office stores this second identifier in the memory of the central office for subsequent use by the particular unit on initiating a next communication. Inasmuch as the received identifier is compared with the stored identifier at the predetermined interval of time, it is impossible for the particular unit to initiate the next communication immediately after termination of the communication which precedes the next communication.

Manners of division of the service area into the cell sets and subdivision of each cell set into at least one cell are dependent on circumstances. When the cell sets and/or the cells of the cell sets are increased in number, an accordingly increased number of control signals must be dealt with in the conventional mobile communication system. A likewise increased number of control signals is necessary upon an increase in number of the mobile units which are in actual communication with some of the base stations. Such being the case, an undesirable delay is unavoidable in establishing a connection as regards each call. This results in a high busy rate to deteriorate service of the mobile communication system.

SUMMARY OF THE INVENTION

It is accordingly an object of the present invention to provide a mobile communication system in which a mobile unit can initiate a call for communication rapidly after termination of a preceding communication.

It is another object of this invention to provide a mobile communication system which is of the type described and in which it is possible to suppress an increase in an amount of traffic of control signals necessary in keeping the mobile communication system in operation.

It is different objects of this invention to provide a base station, a mobile unit, and a central office for use in a mobile communication system of the type described.

Other objects of this invention will become clear as the description proceeds.

On setting forth the gist of an aspect of this invention, it is possible to understand that a mobile communication system comprises: a central office; a plurality of base stations connected to the central office and collectively having an overall service area divided into cell sets which are identified by respective area identifiers and each of which is subdivided into at least one cell, the cells of the cell sets being in one-to-one correspondence to the base stations; and a mobile unit movable in the overall service area and capable of carrying out communication with one of the base stations while present in one of the last-mentioned cells that corresponds to the above-mentioned one of the base stations. Each of the central office, the base stations, and the mobile unit comprises a transmitter/receiver and a memory connected to the transmitter/receiver.

According to the above-mentioned aspect of this invention, the transmitter/receiver of each base station of the above-understood mobile communication system comprises: (A) transferring means for transferring a first identifier of the area identifiers from the memory of the base station under consideration to the memory of a different station of the base stations when the mobile unit moves from a first cell of the last-mentioned cells to a second cell of the last-mentioned cells during the communication, the first cell being in the cell set identified by the first identifier and being in correspondence to the base station in question, the second cell being in the cell set identified by a second identifier of the area identifiers and being in correspondence to the different station; and (B) identifier transmitting means for transmitting the second identifier to the central office and to the mobile unit if the second identifier is different from the first identifier upon termination of the communication. Furthermore, the transmitter/receiver of each of the central office and the mobile unit comprises updating means for updating to the second identifier the memory connected to the last-mentioned transmitter/receiver when supplied with the second identifier from the base station under consideration.

On setting forth the gist of a different aspect of this invention, it is possible to understand that each of a plurality of base stations is connected in a mobile communication system to a central office and collectively has an overall service area divided into cell sets which are identified by respective area identifiers and each of which is subdivided into at least one cell, the cells of the cell sets being in one-to-one correspondence to the base stations, the mobile communication system including a mobile unit movable in the overall service area and capable of carrying out communication with one of the base stations while present in one of the last-mentioned cells that corresponds to the above-mentioned one of the base stations. Each of the central office, the base stations, and the mobile unit comprises a transmitter/receiver and a memory connected to the transmitter/receiver.

According to the different aspect of the invention, the transmitter/receiver of each base station is of the above-understood each of the base stations and comprises: (A) transferring means for transferring a first identifier of the area identifiers from the memory of the base station under consideration to the memory of a different station of the base stations when the mobile unit moves from a first cell of the last-mentioned cells to a second cell of the last-mentioned cells during the communication, the first cell being in the cell set identified by the first identifier and being in correspondence to the base station in question. the second cell being in the cell set identified by a second identifier of the area identifiers and being in correspondence to the different station; and (B) identifier transmitting means for transmitting the second identifier to at least one of the central office and the mobile unit if the second identifier is different from the first identifier upon termination of the communication, the identifier transmitting means transmitting the second identifier to make the transmitter/receiver of the above-mentioned at least one of the central office and the mobile unit update to the second identifier the memory connected to the last-mentioned transmitter/receiver.

On setting forth the gist of a further different aspect of this invention, it is possible to understand that a mobile unit is for use in a mobile communication system comprising a central office and a plurality of base stations connected to the central office and collectively having an overall service area divided into cell sets which are identified by respective area identifiers and each of which is subdivided into at least one cell, the cells of the cell sets being in one-to-one correspondence to the base stations, the mobile unit being movable in the overall service area and capable of carrying out communication with one of the base stations while present in one of the last-mentioned cells that corresponds to the above-mentioned one of the base stations. Each of the central office, the base station, and the mobile unit comprises a transmitter/receiver and a memory connected to the transmitter/receiver. The transmitter/receiver of each base station comprises: (A) transferring means for transferring a first identifier of the area identifiers from the memory of the base station under consideration to the memory of a different station of the base stations when the mobile unit moves from a first cell of the last-mentioned cells to a second cell of the last-mentioned cells during the communication, the first cell being in the cell set identified by the first identifier and being in correspondence to the base station in question, the second cell being in the cell set identified by a second identifier of the area identifiers and being in correspondence to the different station; and (B) identifier transmitting means for transmitting the second identifier to at least one of the central office and the mobile unit if the second identifier is different from the first identifier upon termination of the communication.

According to the further different aspect of this invention, the transmitter/receiver of the above-understood mobile unit comprises updating means for updating to the second identifier the memory connected to the last-mentioned transmitter/receiver when supplied with the second identifier from another of the base stations.

On setting forth the gist of a still further different aspect of this invention, it is possible to understand that a mobile unit is for use in a mobile communication system comprising a central office and a plurality of base stations connected to the central office and collectively having an overall service area divided into cell sets which are identified by respective area identifiers and each of which is subdivided into at least one cell, the cells of the cell sets being in one-to-one correspondence to the base stations, the mobile unit being movable in the overall service area and capable of carrying out communication with one of the base stations while present in one of the last-mentioned cells that corresponds to the above-mentioned one of the base stations. Each of the central office, the base stations, and the mobile unit comprises a transmitter/receiver and a memory connected to the transmitter/receiver. The transmitter/receiver of each base station comprises: (A) transferring means for transferring a first identifier of the area identifiers from the memory of the base station under consideration to the memory of a different station of the base stations when the mobile unit moves from a first cell of the last-mentioned cells to a second cell of the last-mentioned cells during the communication, the first cell being in the cell set identified by the first identifier and being in correspondence to the base station in question, the second cell being in the cell set identified by a second identifier of the area identifiers and in correspondence to the different station; and (B) signal transmitting means for transmitting to the mobile unit, when the communication is terminated at the base station under consideration, a station channel disconnection signal carrying a termination identifier.

According to the still further different aspect of this invention, the transmitter/receiver of the above-understood mobile unit comprises: (A) identifier receiving means for receiving the first identifier from the memory of the base station under consideration; (B) comparing means for comparing the termination identifier with the first identifier received by the identifier receiving means to judge whether or not the termination identifier is different from the last-mentioned first identifier upon termination of the communication; and (C) identifier transmitting means for making the signal transmitting means transmit to the central office the station channel disconnection signal carrying the second identifier if it is judged that the termination identifier is different from the last-mentioned first identifier.

On setting forth the gist of a yet further different aspect of this invention, it is possible to understand that a mobile unit is for use in a mobile communication system comprising a central office and a plurality of base stations connected to the central office and collectively having an overall service area divided into cell sets which are identified by respective area identifiers and each of which is subdivided into at least one cell, the cells of the cell sets being in one-to-one correspondence to the base stations, the mobile unit being movable in the overall service area and capable of carrying out communication with one of the base stations while present in one of the last-mentioned cells that corresponds to the above-mentioned one of the base stations. Each of the central office, the base stations, and the mobile unit comprises a transmitter/receiver and a memory connected to the transmitter/receiver. The transmitter/receiver of each base station comprises: (A) transferring means for transferring a first identifier of the area identifiers from the memory of the base station under consideration to the memory of a different station of the base stations when the mobile unit moves from a first cell of the last-mentioned cells to a second cell of the last-mentioned cells during the communication, the first cell being in the cell set identified by the first identifier and being in correspondence to the base station in question, the second cell being in the cell set identified by a second identifier of the area identifiers and being in one-to-one correspondence to the different station; and (B) signal transmitting means for transmitting to the base station under consideration, when the communication is terminated at the mobile unit, a mobile channel disconnection signal carrying a termination identifier.

According to the yet further different aspect of this invention, the transmitter/receiver of the above-understood mobile unit comprises: (A) identifier receiving means for receiving the first identifier from the memory of the base station under consideration; (B) comparing means for comparing the termination identifier with the first identifier received by the identifier receiving means to judge whether or not the termination identifier is different from the last-mentioned first identifier upon termination of the communication; and (C) identifier transmitting means for making the signal transmitting means transmit to the central office the mobile channel disconnection signal carrying the second identifier if it is judged that the termination identifier is different from the last-mentioned first identifier,

BRIEF DESCRIPTION OF THE DRAWING

FIG. 9 is a flow chart for use in describing operation of each mobile unit used in the system mentioned in conjunction with FIG. 7; and FIG. 10 is a flow chart for use in describing operation of each cell site used in the system mentioned in conjunction with FIG. 7.

DESCRIPTION OF THE PREFERRED EMBODIMENTS

Figure 1:
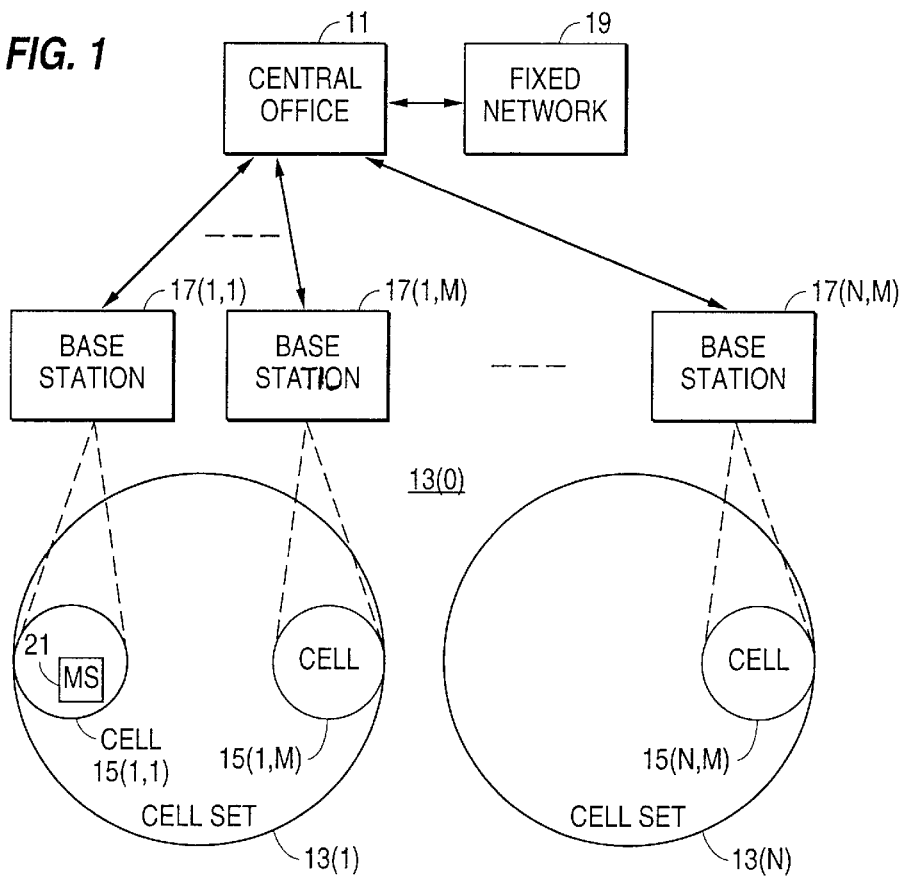
FIG. 1 shows partly in blocks a schematic top view of a mobile communication system to which the present invention is applicable.

Referring to FIG. 1, a mobile communication or telecommunication system or network comprises a central office or station 11 which serves as a mobile communication exchange or switching office. The present invention is applicable to such a mobile communication system in the manner which will be described in the following.

A plurality of cell sites or cell base stations are connected to the central office 11 through wired and/or radio communication channels and collectively have an overall service area 13(0) which is alternatively called a mobile communication area in the art. The overall service area 13(0) is divided into first through N-th cell sets 13(1), 13(2), . . . , and 13(N), where N represents a first predetermined number. The cell sets 13 (suffixes omitted) are alternatively called position register areas for the reason which will presently become clear.

In this manner, an n-th cell set 13(n) is identified by an n-th ordinary number n, where n is variable between 1 and the first predetermined number, both inclusive. Each cell set is consequently called the n-th cell set 13(n) and is designated by the reference symbol 13(n). Each cell set 13(n) has a cell set area. Such an ordinary number n is herein referred to as an n-th position register area identifier or paging area identifier n or briefly as an n-th area identifier n.

Each cell set 13(n) is subdivided into an individual number of cells or radio communication zones. In the example being illustrated, the n-th cell set 13(n) consists of (n, 1)-th through (n, M)-th cells 15(n, 1), 15(n, 2), . . . , and 15(n, M), where M represents the individual number. It will be surmised merely for simplicity of the description that the individual number is common to the cell sets 13 and will be called a second predetermined number.

Like each cell set 13(n), each of the cells 15 (suffixes omitted) of the cell sets 13 is called an (n, m)-th cell 15(n, m) and is designated by 15(n, m), where m is variable between 1 and the second predetermined number M, both inclusive. The (n, 1)-th through the (n, M)-th cells 15(n, 1) to 15(n, M) of the n-th cell set 13(n) may briefly be called n-th cells and will be by 15(n) with the suffixes m omitted.

Although separately depicted for clarity of illustration, the cell sets 13 are contiguous to one another. Similarly, the n-th cells 15(n) are contiguous to one another. As a consequence, each cell 15(n, m) typically has an outline of a regular polygon, such as a regular hexagon. In general, each cell set 13(n) consists of seven cells. Depending on the circumstances, each cell set 13(n) may consist of four cells. It may be that each of some cell sets consists of only one cell. In any event, each cell 15(n, m) has a cell area. The overall service area 13(0) encloses the cell sets 13 like the n-th cell set 13(n) which encloses the n-th cells 15(n).

The cell area is determined in the known manner depending on the circumstances. In other words, the cell area is changed as occasion demands. Likewise, the cell set area is changed. Furthermore, the first and the second predetermined numbers are accordingly changed although each is called a "predetermined" number.

Like the cell sets 13 and the cells 15, the cell sites are illustrated separately from the cells 15 of the cell sets 13. It should be noted in this connection that the cell sites are in one-to-one correspondence to the cells 15 of the cell sets 13 and will consequently be called (1, 1)-th through (N, M)-th cell sites 17(1, 1) to 17(N, M). More particularly, the (n, m)-th cell 15(n, m) corresponds to an (n, m)-th cell site 17(n, m).

Typically, the cell sites 17 (suffixes n and m omitted) are placed in the respective cells 15 of the cell sets 13. More specifically, the (n, m)-th cell site 17(n, m) comprises an omnidirectional antenna system (not shown) centrally of the (n, m)-th cell 15(n, m). Alternatively, each cell site. 17(n, m) comprises a unidirectional antenna system with antennas (not shown) placed, for example, at alternate corners of the cell 15(n, m) which is in correspondence to the cell site 17(n, m) in question.

In the n-th cell set 13(n), (n, 1)-th through (n, M)-th cell sites 17(n) (m omitted) are given an n-th station number n in common. The n-th area identifier n is conveniently used as the n-th station number. Furthermore, each cell site 17(n, m) is identified by a unique combination of ordinary numbers n and m assigned to the (n, m)-th cell site 17(n, m). This combination will be called an (n, m)-th station identifier.

The central office 11 is connected to the cell sites 17 in the manner described above and to a fixed communication network 19 which may be a public communication network. Although details are not depicted, the fixed communication network 19 comprises fixed units or substations which are fixed telephone units or substations and/or data and other fixed communication terminal equipments and are connected to the central office 11 either directly or through one or more local offices.

A plurality of mobile units or substations are movable in the overall service area 13(0) at a time. One of the mobile units is labelled MS at 21 in the (l, l)-th cell 15(l, l) without loss of generality. Such a mobile unit 21 is given a (mobile) unit identifier which may be a subscriber's directory number. Each mobile unit, such as 21, may be a motor-vehicle-mounted unit put into operation automatically or by a user. Alternatively, each mobile unit may be a portable (radio) telephone device carried by a user. Accordingly, the mobile communication system may either be a mobile telephone and/or data telecommunication system or be a portable (radio) telephone system.

The (n, m)-th cell site 17(n, m) is for using a third predetermined number of radio communication channels in carrying out radio communication generally with some of the mobile units which are currently present, namely, either moving or staying standstill, in the (n, m)-th cell 15(n, m) as particular units. The third predetermined number is selected in the known manner depending on traffic of the radio communication in the (n, m)-th cell 15(n, m). In the radio communication channels, down going signals are used from the (n, m)-th cell site 17(n, m) to the particular units. Up going signals are used from the particular units to the (n, m)-th cell site 17(n, m).

In the manner described in the specification of U.S. Pat. No. 4,025,853 issued to Eric John Addeo, the mobile unit 21 may carry out the radio communications, while present in the (n, m)-th cell 15(n, m), with a different cell site which is in correspondence to one of nearby cells of an n'-th cell set 15(n'), where n' represents an n'-th identifier which is equal either to the n-th area identifier n or to the n-th area identifier plus or minus one. This is mainly because the mobile unit 21 is possibly subjected to topological influences of the (n, m)-th cell 15(n, m) and of the nearby cells while present in the (n, m)-th cell 15(n, m). Such a different cell site may be used when the radio communication channels of the (n, m)-th cell site 17(n, m) are all busy.

In such an event, it is possible to understand that the (n, m)-th cell 15(n, m) "corresponds" to the different cell site. At any rate, it will be surmised merely for brevity of the description that the mobile unit 21 is not subjected to the topological influences but carries out the radio communication with the (n, m)-th cell site 17(n, m) while present in the (n, m)-th cell 15(n, m).

One of the down going signals is used when the radio communication should be directed to one of the mobile units that is present in the overall service area 13(0) and is selected as a counterpart unit or substation by one of the fixed units or by another of the mobile units. One of the up going signals is used when the radio communication is directed from such a one of the mobile units to one of the fixed units or to one of other mobile units that is selected as a counterpart unit.

Figures 2, 3, 4:
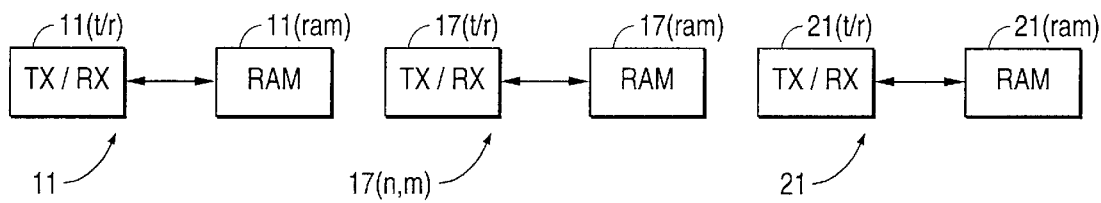
FIG. 2 is a block diagram of a central office for use in the mobile communication system depicted in FIG. 1.
FIG. 3 is a block diagram of each cell site for use in the system illustrated in FIG. 1.
FIG. 4 is a block diagram of each mobile unit for use in the system illustrated in FIG. 1.

Turning to FIGS. 2 through 4 with FIG. 1 continuously referred to, it will be surmised merely for simplicity of the description that only the radio communication channels are used between the central office 11 and the cell sites 17. In this event, the central office 11 comprises an office transmitter/receiver (TX/RX) 11(t/r) and an office random access memory (RAM) 11(ram) connected to the office transmitter/receiver 11(t/r). Each cell site 17(n, m) comprises a site transmitter/receiver 17(t/r) and a site random access memory 17(ram) connected to the site transmitter/receiver 17(t/r). Each of the mobile units, such as 21, comprises a mobile transmitter/receiver 21(t/r) and a mobile random access memory 21(ram) connected to the mobile transmitter/receiver 21(t/r).

It is possible to understand that the office transmitter/receiver 11(t/r) includes an incoming/outgoing device for the fixed communication network 19 and an antenna system for the cell sites 17. The site transmitter/receiver 17(t/r) includes the above-mentioned omnidirectional or unidirectional antenna system. Each of the office and the site transmitter/receivers 11(t/r) and 17(t/r) includes a plurality of subscriber line circuits known in the art. The subscriber line circuits and their equivalents are herein called line circuits. The mobile transmitter/receiver 21(t/r) includes an antenna for a few of the cell sites 17 and a subscriber's terminal equipment, such as a telephone handset and/or a data terminal equipment.

Each of the office, the site, and the mobile transmitter/receivers 11(t/r), 17(t/r), and 21(t/r) further comprises a control circuit for dealing with entries in the office, the site, and the mobile random access memories 11(ram), 17(ram), and 21(ram) and for carrying out comparison in the manner which will later be described. The office, the site, and the mobile random access memories 11(ram), 17(ram), and 21(ram) are preferably nonvolatile. The mobile random access memory 21(ram) has a memory address. Each of the office and the site random access memories 11(ram) and 17(ram) has a plurality of memory addresses which may be equal in number to those used in prior art. Consequently, the office random access memory 11(ram) is what is called a home memory in the art.

Figure 5:
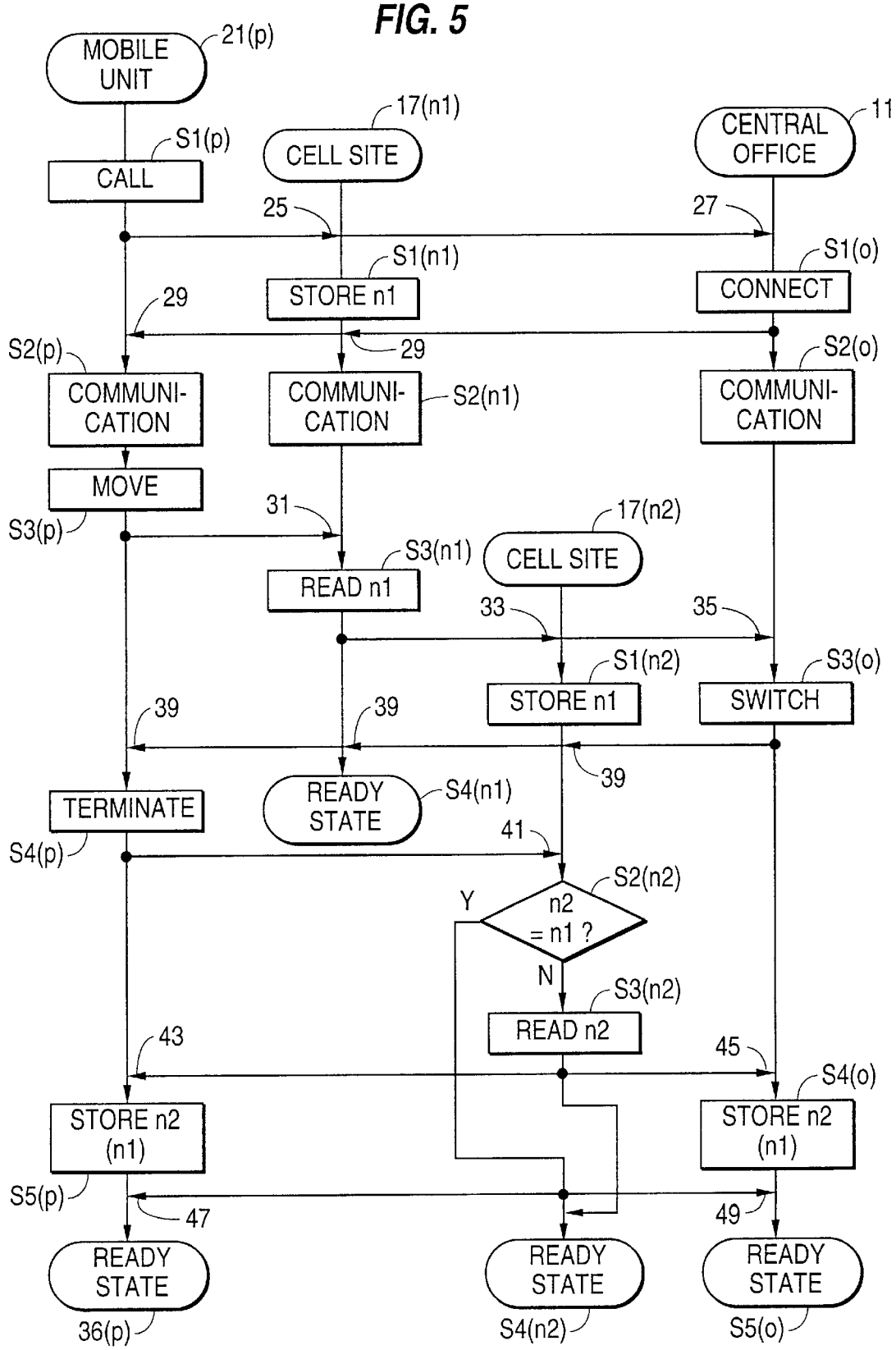
FIG. 5 is a sequence diagram for use in describing operation of the mobile communication system which is depicted in FIG. 1 and which is according to a first embodiment of this invention.

Referring to FIG. 5 with FIGS. 1 through 4 additionally referred to, a mobile communication system is operable as one according to a first embodiment of this invention. One of the mobile units, such as 21, will be referred to as a particular unit 21(p) and is identified by using its unit identifier as a particular identifier p.

It will now be presumed that the particular unit 21(p) is currently present in one of the cells 15 of the cell sites 13 that will be referred to as an (n1, m1)-th cell 15(n1, m1) or simply as a first cell 15(n1) with a combination of ordinary numbers n1 and m1 represented by n1 alone. It will furthermore be presumed that the first cell 15(n1) is in an (n1)-th cell set 13(n1) and is identified by using its area identifier as a first identifier n1.

One of the cell sites 17 is in correspondence to the first cell 15(n1) as a first station 17(n1) and has a first station number n1 which is the first identifier. It should be noted in this connection that a certain number of cell sites 17 are identified by the first station number n1 in common if the (n1)-th cell set 13(n1) consists of this number of cells 15(n1) (suffixes m1 omitted). The first station 17(n1) is furthermore identified by a first station identifier (n1, m1) which will simply be designated by m1. Such a station identifier is unique to each of the cell site 17.

It will be assumed that the particular unit 21(p) initiates a call for communication to a counterpart unit in the meantime at a first (mobile) unit step S1(p) by sending a call origination signal 25 as one of the up going signals to the first station 17(n1) and that at least one of the radio communication channels and at least one of the line circuits of the first station 17(n1) are idle. Besides the particular identifier p, the call origination signal 25 specifies the counterpart unit by a counterpart identifier q which may be its subscriber's directory number. More particularly, the call origination signal 25 carries codes representative of the particular and the counterpart identifiers p and q.

It may be mentioned here that each base station 17(n, m) memorizes an administration table indicative of relationships between the cells 15 of a certain number of cell sets 13 and the last-mentioned cell sets. Supplied with the call origination signal 25, the site transmitter/receiver 17(t/r) of the base station 17(n, m) refers to the administration table in order to locate a particular cell in which the particular unit 21(p) is currently present. Alternatively, each base station 17(n, m) can locate the particular cell by using a verification signal which is described in the Addeo patent referred to in the foregoing if the mobile communication system is a mobile or a portable telephone system.

Through one of the radio communication channels that is idle, the site transmitter/receiver 17(t/r) of the first station 17(n1) receives the call origination signal 25 at one of its line circuits that is used as a particular primary station circuit. The transmitter/receiver 17(t/r) sends a call signal 27 to the central office 11. The call signal 27 indicates the particular identifier p, the first station identifier m1, and the counterpart identifier q. At a first primary step S1(n1), the transmitter/receiver 17(t/r) stores the particular identifier p and the first station number n1 in one of the memory addresses of its site random access memory 17(ram) collectively as a first entry.

Through one of the wired and/or radio communication channels, the office transmitter/receiver 11(t/r) receives the call signal 27 at one of its line circuits that is used as a particular office circuit. Using the first station identifier m1 and the counterpart identifier q, the transmitter/receiver 11(t/r) establishes at a first office step S1(o) a connection between the particular unit 21(p) and the counterpart unit through the primary station and the particular office circuits.

Having established the connection, the central office 11 sends a connection establishment signal 29 to the first station 17(n1) and thence as one of the down going signals to the particular unit 21(p). The user can begin either a talk to an attendant to the counterpart unit or to send a message to the counterpart unit. In the mobile data communication system, the particular unit 21(p) may automatically be put into operation by the connection establishment signal 29.

In this manner and in the manner indicated at a second unit step S2(p), the particular unit 21(p) is put in a busy state of carrying out the communication, namely, of transmitting a communication signal representative of the talk and/or the message. It is indicated at a second primary step S2(n1) that the first station 17(n1) is put in a busy state in connection with one of the radio communication channels and with above-mentioned one of the wired and/or radio communication channels that are used in transmitting the communication signal. The central office 11 is put in a busy state at a second office step S2(o) as regard to the above-mentioned one of the wired and/or radio communication channels and to one of communication channels between the central office 11 and the counterpart unit.

It will now be assumed that the particular unit 21(p) moves during progress of the communication into a second cell 15(n2) identified by using its area identifier as a second identifier n2 which may or may not be identical with the first identifier n1. Corresponding to the second cell 15(n2), a second station 17(n2) has a second station number n2 and is uniquely identified by a second station identifier m2. It will be surmised for brevity of the description that the second identifier n2 is different from the first identifier n1 unless otherwise positively set forth and that the second station 17(n2) has at least one idle radio communication channels and at least one of its line circuits that is left idle.

At a third unit step S3(p), the particular unit 21(p) detects this change between the cells or movement from the first cell 15(n1) to the second cell 15(n2). The movement is detected in the known manner as by monitoring a level of the radio communication channel currently used, by monitoring a bit error rate in a mobile communication system operable by digital signals, or by monitoring a supervisory audible tone (SAT) disclosed in the above-referenced Addeo patent if the mobile communication system is a mobile or a portable telephone system. Detecting the movement, the particular cell 21(p) delivers a switch request signal 31 to the first station 17(n1). The switch request signal 31 indicates the particular identifier p.

Receiving the switch request signal 31, the first station 17(n1) reads at a third primary step S3(n1) the first identifier n1, namely, the first station number n1. The first station 17(n1) thereby supplies the second station 17(n2) with a station switch signal 33 indicative of the particular identifier p, the counterpart identifier q, and the first identifier n1.

The second station 17(n2) receives the station switch signal 3, at one of its line circuits that is used as a particular secondary station circuit. The site transmitter/receiver 17(t/r) of the second station 17(n2) stores at a first secondary step S1(n2) the particular identifier p and the first identifier n1 in one of the memory addresses of the site random access memory 17(ram) of the second station 17(n2) collectively as a second entry. While storing the second entry, the transmitter/receiver 17(t/r) transmits an office switch signal 35 to the central office 11. The office switch signal 35 represents the particular identifier p, the counterpart identifier q, and the second station identifier m2.

The central office 11 receives the office switch signal 35 at one of its line circuits that may again be called a particular office circuit. The official transmitter/receiver 11(t/r) switches at a third office step S3(o) the connection between the particular unit 21(p) and the counterpart unit from a previous combination of the particular office circuit with the primary station circuit to a current combination of the particular office circuit with the secondary station circuit.

In this manner, the office transmitter/receiver 11(t/r) switches the wired and/or radio communication channels from that related to the first station 17(n1) to that concerned with the second station 17(n2). The central office 11 thereby produces a switch completion signal 39.

The site transmitter/receiver 17(t/r) of the second station 17(n2) relays the switch completion signal 39 to the first station 17(n1). The site transmitter/receiver 17(t/r) of the first station 17(n1) relays the switch completion signal 39 further to the particular unit 21(p) while erasing the first entry from its random access memory 17(ram).

The first station 17(n1) is put at a fourth primary step S4(n1) in a ready primary state in which the primary station circuit is put in an idle state capable of dealing with a new communication with another of the mobile units, such as 21, that is present in the first cell 15(n1). The site random access memory 17(ram) can accept a different entry for use in the new communication. Receiving the switch completion signal 39, the mobile transmitter/receiver 21(t/r) of the particular unit 21(p) switches the radio communication channels from that related to the first station 17(n1) to another which is concerned with the second station 17(n2).

It will now be presumed that the communication is terminated in the manner indicated at a fourth unit step S4(p). The mobile transmitter/receiver 21(t/r) sends a termination request signal 41 to the second station 17(n2) having the second station number n2. In other words, the particular unit 21(p) is present in the second cell 15(n2) upon termination of the communication. It therefore results in the example being illustrated that the second identifier n2 is a termination identifier indicative of one of the cells 15 of the cell sets 13 in which the particular unit 21(p) is present upon termination of the communication, Receiving the termination request signal 41, the site transmitter/receiver 17(t/r) of the second station 17(n2) compares at a second secondary step S2(n2) the second station number n2 with the first station number n1 which is stored in its site random access memory 17(ram) at the first secondary step S1(n2). In this manner, the transmitter/receiver 17(t/r) in question judges at the second secondary step S2(n2) whether or not the second identifier n2 is different from the first identifier n1 memorized in the random access memory 17(ram), namely, whether or not the second cell 15(n2) is one of the cell sets 13 that comprises the first cell 15(n1).

It will first be surmised teat the second identifier n2 is different from the first identifier n1 under consideration. In this event, the transmitter/receiver 17(t/r) reads at a third secondary step S3(n2) the second identifier n2 to supply the particular unit 21(p) with a mobile communication termination signal 43 with the second identifier n2 superposed and to supply the central office 11 with an office communication termination signal 45 with the particular identifier p additionally superposed. The mobile and the office communication termination signals 43 and 45 are referred to alternatively as termination identifier notifying and storing signals.

Receiving the mobile communication termination signal 43, the mobile transmitter/receiver 21(t/r) of the particular unit 21(p) stores the second identifier n2 in its mobile random access memory 21(ram) at a fifth unit step S5(p). The particular unit 21(p) is put at a sixth unit step S6(p) in a ready mobile state capable of immediately initiating a next call for communication towards the second station 17(n2).

Having produced the mobile and the office communication termination signals 43 and 45, the site transmitter/receiver 17(t/r) of the second station 17(n2) erases the second entry from its site random access memory 17(ram) and releases the particular secondary station circuit. In this manner, the second station 17(n2) is put at a fourth secondary step S4(n2) in a ready secondary state in connection with the secondary station circuit and with one of the wired and/or radio communication channels that has been used in transmitting the communication signal to the central office 11 and in exchanging control signals between the second station 17(n2) and the central office 11.

Receiving the office communication termination signal 45, the office transmitter/receiver 11(t/r) stores at a fourth office step S4(o) the particular identifier p and the second identifier n2 in the office random access memory 11(ram). The central office 11 is put at a fifth office step S5(o) in a ready office state capable of immediately dealing with the next call reaching from the particular unit 21(p) through the second station 17(n2) either towards a new counterpart unit or towards the counter-part unit having been described. In the ready office state, the particular office circuit is released for use by another call that may be received from any one of the cell sites. It should be noted that the particular unit 21(p), the second station 17(n2), and the central office 11 are substantially simultaneously put in their respective ready states in connection with the communication having been taken into consideration.

It will next be surmised that the second identifier n2 is judged at the second secondary step S2(n2) to be identical with the first identifier n1 memorized as the second entry in the site random access memory 17(ram) of the second station 17(n2). In other words, the first and the second cells 15(n1) and 15(n2) are either identical with each other or in a common one of the cell sets 13.

The termination identifier is now the first identifier n1 and is produced by the site transmitter/receiver 17(t/r) of the second station 17(2) as a result of judgement of identity between the termination identifier and the first identifier n1 stored in the random access memory 17(ram). It is possible to understand that production of the first identifier n1 is indicated by a line labelled Y.

In this event, the site transmitter/receiver 17(t/r) of the second station 17(n2) supplies the particular unit 21(p) with a mobile connection termination signal 47 with the first identifier n1 superposed and the central office 11 with an office connection termination signal 49 with the first identifier n1 similarly superposed. The connection termination signals 47 and 49 are different from the communication termination signals 43 and 45 only in that the first and the second identifiers n1 and n2 are superposed thereon as the termination identifier, Receiving the mobile connection termination signal 47, the mobile transmitter/receiver 21(t/r) of the particular unit 21(p) stores the first identifier n1 in its mobile random access memory 21(ram). Supplied with the office connection termination signal 49, the office transmitter/receiver 11(t/r) stores the first identifier n1 in the office random access memory 11(ram). It should be known that storage of the first identifier n1 in the mobile random access memory 21(ram) is indicated at the fifth unit step S5(p) and in the office random access memory 11(ram), at the fourth office step S4(o).

The particular unit 21(p) is put at the sixth unit step S5(p) in the ready mobile state. Having produced the mobile and the office connection termination signals 47 and 49, the site transmitter/receiver 17(t/r) of the second station 17(n2) erases the second entry from its site random access memory 17(ram). The second station 17(n2) is put at the fourth secondary step S4(n2) in the ready secondary state. The central office 11 is put at the fifth office step S5(o) in the ready office state substantially simultaneously with the sixth unit step s⁶(p) and the fourth secondary step S4(n2).

Reviewing FIGS. 1 through 5, it is readily understood that each of the first and the second stations 17(n1) and 17(n2) can deal substantially concurrently with a plurality of mobile units, such as 21. It is furthermore understood that each cell site 17(n, m), such as the first station 17(n1), comprises a transferring arrangement (S3(n1)) for transferring the first identifier n1 from the memory 17(ram) of the cell site 17(n1)

under consideration to the memory 17(ram) of a different station, such as the second station 17(n2), when the particular unit 21(p) moves from the first cell 15(n1) to the second cell 15(n2) during progress of the communication. It should be noted that the first cell 15(n1), as herein called, is one of the cells 15 of the cell sets 13 in which the particular unit 21(p) is present on initiating a call for communication.

The second station 17(n2) will now be taken into consideration as each cell site 17(n, m) under consideration. The site transmitter/receiver 17(t/r) of the cell site in question comprises an identifier transmitting arrangement (S2(n2), S3(n2)) for transmitting the second identifier n2 to the particular unit 21(p) and to the central office 11 if the second identifier n2 is different from the first identifier n1 upon termination of the communication. In this case, the first identifier n1 was transferred to the cell site 17(n2) under consideration from a particular station of the cell sites 17. Being in correspondence to one of the cells 15 of the cell sets 13 in which the particular unit 21(p) was present on initiating the call, the particular station is the first station 17(n1) in the example being illustrated, The mobile transmitter/receiver 21(t/r) of each of the mobile units, such as 21, comprises an updating arrangement (S5(p)) for updating to the termination identifier the mobile random access memory 21(ram) connected to the transmitter/receiver 21(t/r) under consideration. The office transmitter/receiver 11(t/r) comprises an updating arrangement (S4(o)) for updating to the termination identifier the office random access memory 11(ram). It should be noted that the expression "updating" means afresh storing the termination identifier n2 or n1 in a pertinent one of the mobile and the office random access memories 21(ram) and 11(ram).

More particularly, the identifier transmitting arrangement is taken into consideration in the foregoing as being in the second station 17(n2). The identifier transmitting arrangement comprises a storing unit (S1(n2)) for storing in the memory 17(ram) of the cell site 17(n2) under consideration the first identifier n1 which is transferred from the particular station 17(n1).

In the identifier transmitting arrangement, a comparing unit (S2(n2)) compares the second identifier n2 with the first identifier n1 stored in the memory 17(ram) in question to judge whether or not the second identifier n2 is different from the last-mentioned first identifier n2. If it is judged that the second identifier n2 is not different from the first identifier n1 under consideration, a first ready state setting unit (S4(n2)) sets a single ready state in the cell site 17(n2) under consideration. This single ready state is the ready secondary state described above and for a next call which may next be initiated by one of the mobile units, such as 21, that is present in the cell 15(n2) identified by the second identifier n2.

In the identifier transmitting arrangement, a component identifier transmitting unit (S2(n2), S3(n2)) transmits the first and the second identifiers n1 and n2 to at least one of the particular unit 21(p) and the central office 11 when the second identifier n2 is not different and is different from the first identifier n1, respectively. A second ready state setting unit (S4(n2)) sets the single ready state in the base station 17(n2) for the next call.

Figure 6:
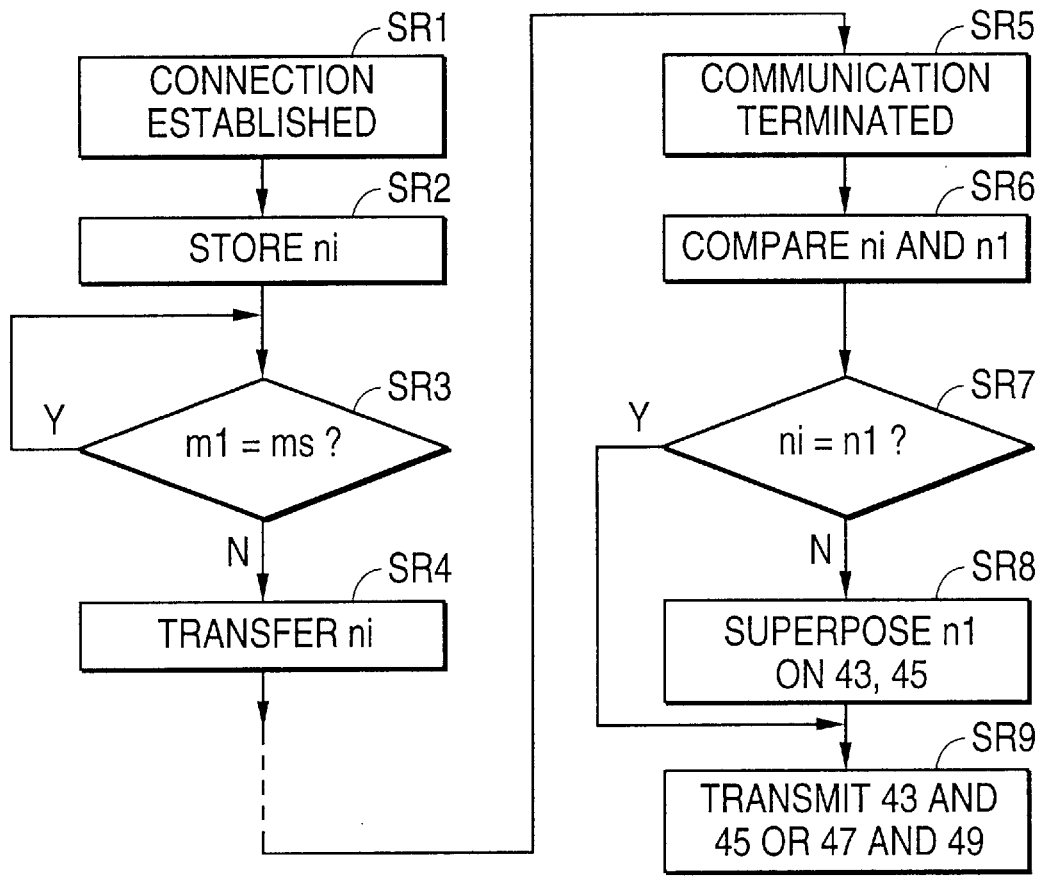
FIG. 6 is a flow chart for use in describing operation of each base station for use in the system mentioned in connection with FIG. 5.

Turning to FIG. 6, the sequence diagram of FIG. 5 will be reviewed. FIGS. 1 through 5 are consequently additionally referred to. It will be assumed that the first station 17(n1) is an arbitrary one of the base stations 17 and that the connection is already established at a first site step SR1 between the particular unit 21(p) and the counterpart unit through the first station 17(n1). Therefore, the first station 17(n1) is put in the busy state indicated in FIG. 5 by the second primary step S2(n1).

It will furthermore be assumed that a call for the communication was initiated by the particular unit 21(p) in an initial cell 15(ni) given an initial identifier ni and that the particular unit 21(p) has moved into the first cell 15(n1) from a previous cell corresponding to a previous station of the base stations 17 and further moves into a succeeding cell which corresponds to a succeeding station uniquely identified by an (ms)-th station identifier ms.

Supplied with the station switch signal 33 from the previous station, the site transmitter/receiver 17(t/r) of the first station 17(n1) stores at a second site step SR2 the initial identifier ni in its site random access memory 17(ram). The second site step SR2 corresponds in FIG. 5 to the first secondary step S1(n2).

At a third site step SR3, the cells or the radio communication zones are compared with each other. More specifically, the first and the succeeding station identifiers m1 and ms are compared. If the succeeding station identifier ms is identical with the first station identifier ml, the site transmitter/receiver 17(t/r) continues the communication. If the zones are different, the transmitter/receiver 17(t/r) transfers the initial identifier ni to the succeeding station at a fourth site step SR4. It is possible to understand that the fourth site step SR4 corresponds to the third primary step S3(n1), It will now be assumed that the communication is terminated at the particular unit 21(p). The site transmitter/ receiver 17(t/r) of the first station 17(n1) receives the termination request signal 41 at a fifth site step SR5 and compares at a sixth site step SR6 the first identifier n1 of the first station 17(n1) under consideration with the initial identifier ni transferred from the previous station and stored in its site random access memory 17(ram).

If the first identifier n1, namely, the first station number n1, is judged at a seventh site step SR7 to be different from the initial identifier ni stored in the site random access memory 17(ram), the site transmitter/receiver 17(t/r) produces at an eighth site step SR8 the mobile and the office communication termination signals 43 and 45 with the first identifier n1 superposed on each of the mobile and the office communication termination signals 43 and 45. At a ninth site step SR9, the transmitter/ receiver 17(t/r) transmits the mobile and the office communication termination signals 43 and 45 to the particular unit 21(p) and to the central office 11.

If the first identifier n1 is judged at the seventh site step SR7 to be identical with the initial identifier ni, the transmitter/receiver 17(t/r) transmits at the ninth site step SR9 the mobile and the office connection termination signals 47 and 49 to the particular unit 21(p) and to the central office 11. The first identifier n1 is superposed on each of the mobile and the office connection termination signals 47 and 49.

Figure 7:
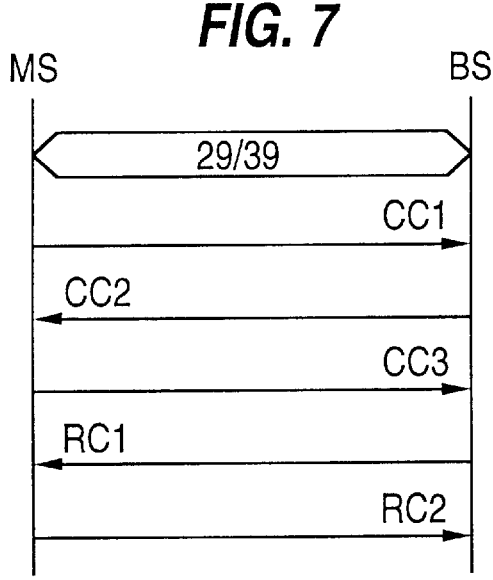
FIG. 7 is a sequence diagram for use in describing operation of a mobile communication system which is depicted in FIG. 1 and which is according to a second embodiment of this invention.

Referring now to FIG. 7 with FIGS. 1 through 5 additionally referred to, the description will proceed to a mobile communication system which is operable as one according to a second embodiment of this invention. The particular unit 21(p) will be taken into consideration like in FIG. 5 and is indicated at MS. One of the base stations 17 is indicated at BS.

It will be presumed that the communication is carried out between the particular unit MS and the counterpart unit through the base station BS in the manner described in conjunction with FIG. 5 and indicated along a first or top row labelled 29/39 and that the termination request signal 41 is transmitted from the particular unit MS to the base station BS. Along a second row, the termination request signal 41 is indicated with a label CC1. The base station BS initiates a disconnection sequence which comprises the steps S2(n2), S3(n2), S5(p), S4(o), S6(p), S4(n2), and S5(o) described in connection with FIG. 5.

In the mobile communication system being illustrated, the base station BS supplies the particular unit MS, upon reception of the termination request signal CC1, with a release signal CC2 depicted along a third row. Receiving the release signal CC2, the particular unit MS supplies the base station BS with a release acknowledgement signal CC3 illustrated along a fourth row. Supplied with the release acknowledgement signal CC3, the base station BS locates the termination identifier given to one of the cells 15 of the cell sets 13 in which the particular unit MS is present and has produced the release acknowledgement signal CC3.

Having located the termination identifier, the base station BS supplies the particular unit MS with a radio channel disconnection signal RC1 which is depicted along a fifth row and which carries the termination identifier in correspondence to the mobile communication termination signal 43. Furthermore, the base station BS supplies the central office 11 with the office communication termination signal 45. Inasmuch as the fourth office step S4(o) is carried out in the central office 11, it is possible to understand that the radio channel disconnection signal RC1 indicates completion of storage of the termination identifier in the office random access memory 11(ram).

Receiving the radio channel disconnection signal RC1, the particular unit MS transmits a disconnection acknowledgement signal RC2 to the base station BS as depicted along a sixth or bottom row. In the manner which will presently be described in connection with each mobile unit MS and each cell site BS, the particular unit with, the base station BS, and the central office 11 are put in the ready states indicated in FIG. 5 at the steps S6(p), S4(n2), and S5(o).

Figure 8:
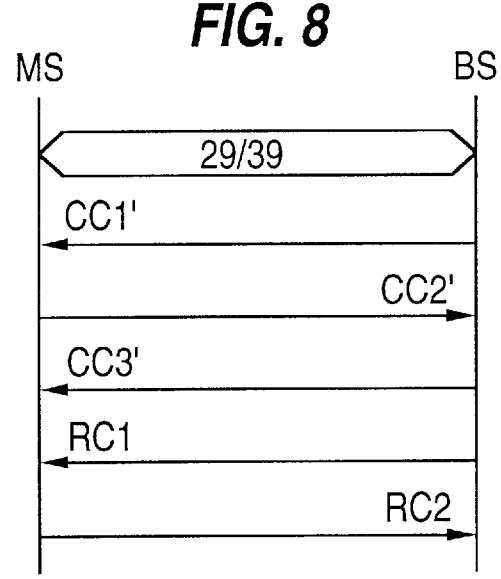
FIG. 8 is another sequence diagram for use in describing operation of the mobile communication system mentioned in connection with FIG. 7.

Turning to FIG. 8 with reference to FIGS. 1 through 5 and 7 continued, it will again be presumed that the communication is in progress in the manner indicated at 29/39 along a first or top row between the particular unit MS and the counterpart unit through the base station BS. It will now be assumed that the communication is terminated at the counterpart unit.

The base station BS receives from the counterpart unit a termination request signal of the type indicated in FIG. 5 at 41. Receiving such a termination request signal from the counterpart unit, the base station BS supplies the particular unit MS with the termination request signal depicted along a second row at CC1'. Receiving the termination request signal CC1', the particular unit MS supplies the base station BS with a release signal CC2' illustrated along a third row. Receiving the release signal CC2', the base station BS supplies the particular unit MS with a release acknowledgment signal CC3' depicted along a fourth row.

A predetermined interval of time after supply of the release acknowledgment signal CC3' to the particular unit MS, the base station BS suppliers the particular unit MS with the mobile communication termination signal 43 as the radio channel disconnection signal RC1 depicted along a fifth row. Furthermore, the base station BS supplies the central office 11 with the office communication termination signal 45.

Receiving the radio channel disconnection signal RC1, the particular unit MS supplies the base station BS with the disconnection acknowledgement signal RC2 depicted along a sixth or bottom row. In FIG. 8, the predetermined interval of time is used in order that the particular unit MS may finish release of the radio communication channel in timed relation to transmission of the disconnection acknowledgement signal RC2 to the base station BS. The predetermined interval of time may be, for example, about fifty milliseconds long.

Reviewing FIGS. 7 and 8 with FIGS. 1 through 5 additionally referred to, it may be mentioned here that a termination identifier, such as the first or the second identifier n1 or n2 described in connection with FIG. 5, is superposed on the radio channel disconnection signal RC1, namely, on the mobile communication or connection termination signal 43 or 47 and on the office communication or connection termination signal 45 or 49, by time division, frequency division, or time and frequency division multiplexing. When the time division multiplexing is resorted to, the radio channel disconnection signal RC1 becomes a little longer than a similar signal used in prior art without superposition of the termination identifier. It is, however, possible by the superposition to avoid traffic congestion which would otherwise be inevitable in order to store the termination identifier in the mobile and the office random access memories 21(ram) and 11(ram) after termination of the communication.

FIG. 5 will be referred to more in particular among FIGS. 1 through 5, 7, and 8. It is understood that the site transmitter/receiver 17(t/r) of each base station 17(n, m) or BS comprises a signal transmitting arrangement (S2(n2), S3(n2)) for transmitting the radio channel disconnection signal RC1 as a station channel disconnection signal when the communication is terminated at the counterpart unit and consequently in the base station under consideration. The station channel disconnection signal RC1 carries the termination identifier, Again reviewing FIG. 7 with additional reference to FIGS. 1 through 5, the termination identifier will be designated by nt. It will now be assumed that the particular unit MS terminates the communication while present in one of the cells 15 of the cell sets 13 that corresponds to a termination station 17(nt) or BS having the termination identifier nt as its station number.

It is possible in this event to understand the release acknowledgement signal CC3 as a mobile channel disconnection signal. The particular unit MS transmits the mobile channel disconnection signal CC3 to the termination station BS. In the termination station BS, the mobile channel disconnection signal CC3 makes its site transmitter/receiver 17(t/r) transmit back to the particular unit MS the radio channel disconnection signal RC1 as a station channel disconnection signal carrying the termination identifier nt. In the manner described above, the termination identifier nt indicates as one of the area identifiers the cell set comprising the termination cell in which the particular unit MS is present upon termination of the communication.

Referring to FIG. 9 with FIGS. 1 through 5, 7, and 8 additionally referred to, the sequence diagram of FIG. 7 will be reviewed. Attention is directed to each mobile unit MS.

The particular unit MS receives the radio channel disconnection signal RC1 at a first mobile step SS1 and transmits the disconnection acknowledgement signal RC2 to the termination station BS at a second mobile step SS2. In the meantime, the mobile transmitter/receiver 21(t/r) of the particular unit MS may compare at a third mobile step SS3 the termination identifier nt with the initial identifier ni which may preliminarily be stored in its mobile random access memory 21(ram) as a memorized identifier. At a fourth mobile step SS4, the transmitter/receiver 21(t/r) judges whether or not the memorized identifier ni is different from the termination identifier nt received from the termination station BS on the radio channel disconnection signal RC1 as a received identifier.

If it is judged at the fourth mobile step SS4 that the received identifier nt is different from the memorized identifier ni, the mobile transmitter/receiver 21(t/r) updates at a fifth mobile step SS5 the memorized identifier ni to the received identifier nt in its random access memory 21(ram). The fifth mobile step SS5 corresponds to the fifth unit step S5(p) described in connection with FIG. 5. Subsequently, the particular unit MS is put at a sixth mobile step SS6 in the ready mobile state indicated in FIG. 5 at the sixth unit step S6(p). If it is judged at the fourth mobile step SS4 that the received identifier nt is identical with the memorized identifier ni, the particular unit MS is put directly into the ready mobile state at the sixth mobile step SS6.

Turning to FIG. 10 with FIGS. 1 through 5, 7, and 8 additionally referred to, it will be assumed that the communication is terminated either by the particular unit MS or by the counterpart unit while the particular unit MS is present in one of the cells 15 of the cell sets 13 that corresponds to the termination station BS. Attention will be directed to the termination station BS which is the second station 17(n2) in FIG. 5.

Receiving the disconnection acknowledgement signal RC2 at a first station step ST1, the site transmitter/receiver 17(t/r) of the termination station BS releases at a second station step BT2 one of its radio communication channels and one of its wired and/or radio communication channels that have been used in carrying out the communication between the particular unit MS and the counterpart unit through the termination station BS. Prior to the second station step ST2, the site transmitter/receiver 17(t/r) loads at a third station step ST3 the site access memory 17(ram) as a memorized identifier with the initial identifier ni in the manner described in conjunction with FIG. 5 at the first secondary step S1(n2). At a fourth station step ST4, the transmitter/receiver 17(t/r) compares the received identifier nt with the memorized identifier ni. The fourth station step ST4 corresponds to the second secondary step S2(n2).

If it is judged at a fifth station step ST5 that the memorized identifier ni is different from the received identifier nt, the transmitter/receiver 17(t/r) transmits at a sixth station step ST6 the mobile and the office communication termination signals 43 and 45 to the particular unit MS and to the central office 11. The mobile communication termination signal 43 is the radio channel disconnection signal RC1 described in connection with FIGS. 7 and 8.

While this invention has thus far been described in specific conjunction with a few preferred embodiments thereof and a few modifications, it will now be readily possible for one skilled in the art to carry this invention into effect in various other manners. For example, the mobile communication system may comprise a plurality of central offices, such as 11, each for at least one of the cell sets 13 of the overall service area 13(0). The base stations 17 may directly exchange control signals to and from another.

Each of the mobile units, such as 21 or MS, may compare the initial identifier ni or the first identifier n1 with the termination identifier nt or the second identifier n2 and, if it is judged that the termination identifier nt is different from the initial identifier ni, either may make the signal transmitting arrangement of the termination station 17(nt) supply the central office 11 with the station channel disconnection signal carrying the termination identifier nt or may supply the termination station 17(nt) and the central office 11 with the mobile channel disconnection signal on which the termination identifier nt and the particular identifier p are superposed. In such an event, the termination identifier nt is received on the radio channel disconnection signal RC1 at the first mobile step SS1 as a received identifier. The third through the sixth station steps ST3 to ST6 of FIG. 10 are carried out in each mobile unit MS as "third" through "sixth" mobile steps ST3) to ST6 after the first mobile step SS1.

More particularly, the mobile transmitter/receiver 21(t/r) comprises an identifier receiving unit for receiving the initial identifier ni from the memory 17(ram) of the termination station 17(nt). The initial identifier ni is readily superposed on a down going signal transmitted from the termination station 17(nt) to the mobile unit MS. It is consequently possible to understand that the identifier receiving unit is indicated in FIGS. 7 and 8 by arrowheads in the third and the second rows for the release signal CC2 and the termination request signal CC1'. Alternatively, the initial identifier ni may be carried by the switch completion signal 39 relayed from the initial station to the mobile unit MS. It is possible in this event to understand that the identifier receiving unit is depicted in FIG. 5 by an arrowhead which reaches the particular unit 21(p) and is designated by the reference numeral 39.

A comparing unit (ST3, ST4) compares the received identifier nt with the initial identifier ni and may comprise a storing unit (ST3) for storing the initial identifier ni in the memory 21(ram) as a memorized identifier and a component or element comparing unit (ST4) for comparing the received identifier nt with the memorized identifier ni. If it is judged that the received identifier nt is different from the memorized identifier ni, an identifier transmitting unit (ST6) makes the signal transmitting arrangement transmit to the central office 11 the radio channel disconnection signal RC1.

What is claimed is:

1. A mobile communication system comprising:

a central office;

a plurality of base stations connected to said central office and collectively having an overall service area divided into cell sets which are identified by respective area identifiers and each of which is subdivided into at least one cell, said cells of said cell sets being in one-to-one correspondence to said base stations; and a mobile unit movable in said overall service area and capable of carrying out communication with one of said base stations while present in a corresponding cell of said one of said base stations, each of said central office, said base stations, and said mobile unit comprising a transmitter/receiver and a memory connected to said transmitter/receiver and wherein the transmitter/receiver of each base station includes,
    receiving means for receiving a switch request signal from said mobile unit when said mobile unit moves from a first cell controlled by a first base station to a second cell controlled by a second base station during said communication, said switch request signal including a first identifier which identifies said mobile unit and said first base station;
    transferring means for transferring only said first identifier of said area identifiers from the memory of said first base station to the memory of said second base station when said mobile unit moves from said first cell to said second cell during said communication, said first cell being in the cell set identified by said first identifier and being in correspondence to said first base station, said second cell being in the cell set identified by a second identifier of said area identifiers and being in correspondence to said second base station, wherein said transferring means transfers said first identifier directly from said first base station to said second base station without using said mobile station, and identifier transmitting means for transmitting only said second identifier to said central office as an office switch signal and to said mobile unit as a downlink signal, as part of a call termination identifier, if said second identifier is different from said first identifier upon termination of said communication, the transmitting of said second identifier only being done during said termination of said communication and not during other portions of said communication;

the transmitter/receiver of each of said central office and said mobile unit comprising updating means for updating, to said second identifier, the memory connected to the transmitter/receiver when supplied with said second identifier upon receipt of said office switch signal and said downlink signal, respectively.

2. A mobile communication system as claimed in claim 1, wherein said identifier transmitting means transmits to said central office and to said mobile unit the first identifier transferred from the memory of said base station to the memory of said different base station if said second identifier is identical with the first identifier.

3. A mobile communication system as claimed in claim 1, wherein the transmitter/receiver of said base station further comprises signal transmitting means for transmitting to said mobile unit, when said communication is terminated at said base station, a station channel disconnection signal carrying said call termination identifier indicating the cell set last-mentioned of the last-mentioned cell in which said mobile unit is present upon termination of said communication.

4. A mobile communication system as claimed in claim 1, wherein the transmitter/receiver of said mobile unit further comprises signal transmitting means for transmitting to said base station, when said communication is terminated at said mobile unit, a mobile channel disconnection signal which makes said base station transmit to said central office and to said mobile unit a station channel disconnection signal carrying a termination identifier indicative of the cell set in which said mobile unit is present upon termination of said communication.

5. Each of a plurality of base stations connected in a mobile communication system to a central office and collectively having an overall service area divided into cell sets which are identified by respective area identifiers and each of which is subdivided into at least one cell, the cells of said cell sets being in one-to-one correspondence to said base stations, said mobile communication system including a mobile unit movable in said overall service area and capable of carrying out communication with one of said base stations while present in a corresponding cell of said one of said base stations, each of said central office, said base stations, and said mobile unit comprising a transmitter/receiver and a memory connected to said transmitter/receiver, wherein the transmitter/receiver of each base station comprises:

receiving means for receiving a switch request signal from said mobile unit when said mobile unit moves from a first cell controlled by a first base station to a second cell controlled by a second base station during said communication, said switch request signal including a first identifier which identifies said mobile unit and said first base station;

transferring means for transferring only said first identifier of said area identifiers from the memory of said each base station to the memory of said second base station when said mobile unit moves from said first cell during said communication, said first cell being in the cell set identified by said first identifier and being in correspondence to said first base station, said second cell being in the cell set identified by a second identifier of said area identifiers and being in correspondence to said second base station; and identifier transmitting means for transmitting only said second identifier to at least one of said central office as an office switch signal and said mobile unit as a downlink signal, as part of a call termination identifier, if said second identifier is different from said first identifier upon termination of said communication, upon receipt of said office switch signal and said downlink signal, respectively, said identifier transmitting means transmitting said second identifier to make the transmitter/receiver of said at least one of the central office and the mobile unit update, to said second identifier, the memory connected to the transmitter/receiver, wherein the transmitting of said second identifier is performed only during said termination of said communication and not during other portions of said communication.

6. Each of the base stations as claimed in claim 5, wherein said identifier transmitting means comprises:

storing means for storing in the memory of said each base station the first identifier which is transferred from the memory of another of said base station;

comparing means for comparing said second identifier with said first identifier stored in the memory of said base station to judge whether or not said second identifier is different from said first identifier;

first ready state setting means for setting a ready state for a next communication in said base station after said first identifier is transmitted to said at least one of the central office and the mobile unit when it is judged that said second identifier is not different from said first identifier;

component identifier transmitting means for transmitting said second identifier to said at least one of the central office and the mobile unit when said second identifier is different from said first identifier; and second ready state setting means for setting said ready state in said base station after said second identifier is transmitted to said at least one of the central office and the mobile unit when said second identifier is different from said first identifier.

7. A central office for use in a mobile communication system comprising a plurality of base stations connected to said central office and collectively having an overall service area divided into cell sets which are identified by respective area identifiers and each of which is subdivided into at least one cell, the cells of said cell sets being in one-to-one correspondence to said base stations, said mobile communication system including a mobile unit movable in said overall service area and capable of carrying out communication with one of said base stations while present in a corresponding cell of said one of said base stations, each of said central office, said base stations, and said mobile unit comprising a transmitter/receiver and a memory connected to said transmitter/receiver, the transmitter/receiver of each base station comprising:

(A) receiving means for receiving a switch request signal from said mobile unit when said mobile unit moves from a first cell controlled by a first base station to a second cell controlled by a second base station during said communication, said switch request signal including a first identifier which identifies said mobile unit and said first base station;

(B) transferring means for transferring only said first identifier of said area identifiers from the memory of said each base station to the memory of a different base station when said mobile unit moves from said first cell to said second cell during said communication, said first cell being in the cell set identified by said first identifier and being in correspondence to said first base station, said second cell being in the cell set identified by a second identifier of said area identifiers and being in correspondence to said second base station; and (C) identifier transmitting means for transmitting only said second identifier to at least one of said central office as an office switch signal and said mobile unit as a downlink signal if said second identifier is different from said first identifier upon termination of said communication, wherein the transmitting of said second identifier is performed only during said termination of said communication and not during other portions of said communication, wherein the transmitter/receiver of said central office comprises updating means for updating, to said second identifier, the memory connected to the transmitter/receiver when supplied with said second identifier, upon receipt of said office switch signal and said downlink signal, respectively.

8. A central office as claimed in claim 7, said identifier transmitting means transmitting to said at least one of the central office and the mobile unit the first identifier transferred by said transferring means if said second identifier is not different from said first identifier upon termination of said communication, wherein said updating means stores the first identifier transmitted by said identifier transmitting means.

9. A mobile unit for use in a mobile communication system comprising a central office and a plurality of base stations connected to said central office and collectively having an overall service area divided into cell sets which are identified by respective area identifiers and each of which is subdivided into at least one cell, the cells of said cell sets being in one-to-one correspondence to said base stations, said mobile unit being movable in said overall service area and capable of carrying out communication with one of said base stations while present in a corresponding cell of said one of said base stations, each of said central office, said base stations, and said mobile unit comprising a transmitter/receiver and a memory connected to said transmitter/receiver, the transmitter/receiver of each base station comprising:

(A) receiving means for receiving a switch request signal from said mobile unit when said mobile unit moves from a first cell controlled by a first base station to a second cell controlled by a second base station during said communication, said switch request signal including a first identifier which identifies said mobile unit and said first base station;

(B) transferring means for transferring only said first identifier of said area identifiers from a corresponding memory of said each base station to the memory of said second base station when said mobile unit moves from said first cell to said second cell during said communication, said first cell being in the cell set identified by said first identifier and being in correspondence to said first base station, said second cell being in the cell set identified by a second identifier of said area identifiers and being in correspondence to said second base station; and (C) identifier transmitting means for transmitting only said second identifier to at least one of said central office as an office switch signal and said mobile unit as a downlink signal if said second identifier is different from said first identifier upon termination of said communication, wherein the transmitting of said second identifier is performed only during said termination of said communication and not during other portions of said communication, wherein the transmitter/receiver of said mobile unit comprises updating means for updating, to said second identifier, the memory connected to the transmitter/receiver when supplied with said second identifier, upon receipt of said office switch signal and said downlink signal, respectively.

10. A mobile unit as claimed in claim 9, said identifier transmitting means transmitting to said at least one of the central office and the mobile unit the first identifier transferred by said transferring means if said second identifier is not different from said first identifier upon termination of said communication, wherein said updating means stores the first identifier transmitted by said identifier transmitting means.

11. A mobile unit for use in a mobile communication system comprising a central office and a plurality of base stations connected to said central office and collectively having an overall service area divided into cell sets which are identified by respective area identifiers and each of which is subdivided into at least one cell, the cells of said cell sets being in one-to-one correspondence to said base stations, said mobile unit being movable in said overall service area and capable of carrying out communication with one of said base stations while present in a corresponding cell of said one of said base stations, each of said central office, said base stations, and said mobile unit comprising a transmitter/receiver and a memory connected to said transmitter/receiver, the transmitter/receiver of each base station comprising:

(A) receiving means for receiving a switch request signal from said mobile unit when said mobile unit moves from a first cell controlled by a first base station to a second cell controlled by a second base station during said communication, said switch request signal including a first identifier which identifies said mobile unit and said first base station;

(B) transferring means for transferring only said first identifier of said area identifiers from the memory of said each base station to the memory of said second base station when said mobile unit moves from said first cell to said second cell during said communication, said first cell being in the cell set identified by said first identifier and being in correspondence to said first base station, said second cell being in the cell set identified by a second identifier of said area identifiers and being in correspondence to said second base station; and (C) signal transmitting means for transmitting only to said mobile unit, when said communication is terminated at said second base station, a station channel disconnection signal carrying a termination identifier of said area identifiers,
   wherein the transmitting of said termination identifier is performed only during said termination of said communication and not during other portions of said communication,
   wherein the transmitter/receiver of said mobile unit comprises:
      identifier receiving means for receiving said first identifier;
      comparing means for comparing said termination identifier with the first identifier received by said identifier receiving means to judge whether or not said termination identifier is different from said first identifier upon termination of said communication; and
      identifier transmitting means for making said signal transmitting means transmit to said central office the station channel disconnection signal carrying said second identifier as said termination identifier if it is judged that said termination identifier is different from said first identifier.

12. A mobile unit as claimed in claim 11, wherein said identifier transmitting means makes said signal transmitting means transmit to said central office the station channel disconnection signal carrying said first identifier as said termination identifier if it is judged that said termination identifier is not different from said first identifier.

13. A mobile unit as claimed in claim 11, wherein said comprising means comprises:
   sorting means for storing said first identifier in the memory of said mobile unit; and
   component comparing means for comparing said termination identifier with said first identifier stored in the memory of said mobile unit to judge whether or not said termination identifier is different from said first identifier.

14. A mobile unit for use in a mobile communication system comprising a central office and a plurality of base stations connected to said central office and collectively having an overall service area divided into cell sets which are identified by respective area identifiers and each of which is subdivided into at least one cell, the cells of said cell sets being in one-to-one correspondence to said base stations, said mobile unit being movable in said overall service area and capable of carrying out communication with one of said base stations while present in a corresponding cell of said one of said base stations, each of said central office, said base stations, and said mobile unit comprising a transmitter/receiver and a memory connected to said transmitter/receiver, the transmitter/receiver of each base station comprising:
   (A) receiving means for receiving a switch request signal from said mobile unit when said mobile unit moves from a first cell controlled by a first base station to a second cell controlled by a second base station during said communication, said switch request signal including a first identifier which identifies said mobile unit and said first base station;
   (B) transferring means for transferring only said first identifier of said area identifiers from the corresponding memory of said each base station to the memory of said second base station when said mobile unit moves from said first cell to said second cell during said communication, said first cell being in the cell set identified by said first identifier and being in correspondence to said first base station, said second cell being in the cell set identified by a second identifier of said area identifiers and being in correspondence to said second base station; and
   (C) signal transmitting means for transmitting to the other base stations, when said communication is terminated at said mobile unit, only a mobile channel disconnection signal carrying a termination identifier of said area identifiers, the transmitting of said termination identifier only being done during said termination of said communication and not during other portions of said communication, wherein the transmitter/receiver of said mobile unit comprises:
      identifier receiving means for receiving said first identifier;
      comparing means for comparing said termination identifier with the first identifier received by said identifier receiving means to judge whether or not said termination identifier is different from said first identifier upon termination of said communication; and
      identifier transmitting means for making said signal transmitting means transmit to said central office the mobile channel disconnection signal carrying said second identifier as said termination identifier if it judged that said termination identifier is different from said first identifier.

15. A mobile unit as claimed in claim 14, wherein said identifier transmitting means makes said signal transmitting means transmit to said central office the mobile channel disconnection signal carrying said first identifier as said termination identifier if it is judges that said termination identifier is not different from said first identifier.

16. A mobile unit as claimed in claim 14, wherein said comparing means comprises:
   storing means for storing said first identifier in the memory of said mobile unit; and
   component comparing means for comparing said termination identifier with said first identifier stored in the memory of said mobile unit to judge whether or not said termination identifier is different from said first identifier.

17. A mobile communication system comprising:
   a plurality of base stations;
   a plurality of cells, said cells being grouped into a plurality of cell sets, each of said cell sets having a unique designator, each of said base stations being associated with one of said cells;
   a mobile unit, placing and receiving telephone calls via the base station associated with a current cell, said current cell being the cell within which the mobile unit is currently located;
   a central office communicating with said plurality of base stations, said central office having means for enabling a telephone call to continue when said mobile unit moves from a former cell to its current cell by transferring responsibility for said call from a former base station related to said former cell to said current base station related to said current cell,
   each base station, as a former base station, having means for informing a newly current base station of said unique designator of said cell set corresponding to the cell in which the mobile unit was located when the call originated upon movement of the mobile unit between cells; and each base station, as a current base station, having receiving means for receiving from said mobile unit a switch request signal when said mobile unit moves from said former cell to said current cell, having comparing means for comparing, only at the time of call termination, a cell set designator of said current cell to the cell set designator corresponding to the call origination cell set, and means for informing said mobile unit, only at the time of said call termination, of the current cell set designator if it differs from the call origination cell set designator, and informing the mobile unit, only at the time of said call termination, that there is no change in cell set designators if the current cell set designator equals the call origination cell set designator.

18. A method for communicating in a mobile communication system, said mobile communication system including a central office, a plurality of base stations connected to said central office and collectively having an overall service area divided into cell sets, each cell set being identified by a respective area identifier and subdivided into at least one cell, said cells of said cell sets being in one-to-one correspondence to said base stations, said mobile communication system further including a mobile unit moveable in said overall service area and capable of communicating with one of said base stations while present in a corresponding cell of said one of said base stations, each of said central office, said base stations, and said mobile unit comprising a transmitter/receiver and a memory connected to said transmitter/receiver, said method comprising the steps of:

said mobile unit placing and receiving telephone calls via said base station associated with a current cell, said current cell being the cell within which said mobile unit is located;

said mobile unit notifying a former base station related to a former cell of a movement of said mobile unit from said former cell to a current cell;

said former base station notifying said central office of said movement of said mobile unit;

said central office transferring responsibility for said call from said former base station to a current base station related to said current cell, thereby enabling one of said telephone calls to continue when said mobile unit moves from said former cell to said current cell;

each former base station, upon movement of said mobile unit between cells, informing a newly current base station of a designator of the cell set corresponding to the cell in which said mobile unit was located when the call originated;

at the time of call termination, said base station of said current cell comparing a cell set designator of said current cell to the cell set designator corresponding to the call origination cell;

said base station of said current cell informing said mobile unit of said current cell set designator, only at the time of said call termination and at no other time, if said current cell set designator differs from said call origination cell set designator; and said base station of said current cell informing said mobile unit, only at the time of said call termination and at no other time, that there is no change in cell set designators if said current cell set designator equals said call origination cell set designator.

19. A method for use in a mobile communication system comprising a central office and a plurality of base stations connected to said central office and collectively having an overall service area divided into cell sets which are identified by respective area identifiers and each of which is subdivided into at least one cell, the cells of said cell sets being in one-to-one correspondence to said base stations, said mobile unit being movable in said overall service area and capable of carrying out communication between said mobile unit and a counterpart unit using one of said base stations while present in a corresponding cell of said one of said base stations, each of said central office, said base stations, and said mobile unit comprising a transmitter/receiver and a memory connected to said transmitter/receiver, the method comprising the steps of:

a) detecting movement of said mobile unit from a first cell to said a second cell;

b) sending a cell switch signal from said mobile unit to a first base station corresponding to said first cell, said cell switch signal indicating said movement of said mobile unit from said first cell, said cell switch signal also including information indicative of an identifier of said mobile unit, said counterpart unit, and an initial cell from which said mobile unit had initiated said communication to said counterpart unit;

c) receiving at said first base station said cell switch signal sent from said mobile unit;

d) storing said information corresponding to said cell switch signal at said first base station;

e) sending said cell switch signal from said first base station to a second base station corresponding to said second cell;

f) storing said information corresponding to said cell switch signal at said second base station;

g) receiving a call termination signal at said second base station sent from said mobile unit;

h) determining, at said second base station, only after receiving said call termination signal and not before, whether an identifier corresponding to said second cell is identical to said identifier of said initial cell from which said communication was initiated;

i) sending said identifier corresponding to said second cell as an identifier of said mobile unit to a central office and sending said identifier corresponding to said second cell as said identifier of said mobile unit to said mobile unit when a non-identical determination is made in the step h), the sending during the step i) only being performed after the call termination signal has been sent from said mobile unit; and j) storing, as a new identifier of said mobile unit, said identifier corresponding to said second cell at said central office and at said mobile unit when said non-identical determination is made in the step h), wherein said mobile unit can immediately initiate a new communication with another mobile unit after the storing performed in the step j).

20. A mobile communication system, comprising:

a central office;

a plurality of base stations connected to said central office and collectively having an overall service area divided into cell sets which are identified by respective area identifiers and each of which is subdivided into at least one cell, the cells of said cell sets being in one-to-one correspondence to said base stations; and a mobile unit movable in said overall service area and capable of carrying out communication in said mobile communication system with one of said base stations while present in one of the cells that corresponds to said one of the base stations, each of said central office, said base stations, and said mobile unit comprising a transmitter/receiver and a memory connected to said transmitter/receiver, wherein the transmitter/receiver of each base station comprises:

during said communication in said mobile communication system, transferring means for transferring only a first identifier of said area identifiers from the memory of said each base station to the memory of a different station of said base stations when said mobile unit moves from a first cell of the cells to a second cell of the cells, said first cell being in the cell set identified by said first identifier and being in correspondence to said each base station, said second cell being in the cell set identified by a second identifier of said area identifiers and being in correspondence to said different station; and during a termination process of said communication in said mobile communication system, identifier transmitting means for transmitting said second identifier to at least one of said central office and said mobile unit if said second identifier is different from said first identifier, the transmitting of said second identifier only being done during said termination process and not during other portions of said communication.

the transmitter/receiver of each of said central office and said mobile unit comprising updating means for updating to said second identifier the memory connected to the corresponding transmitter/receiver when supplied with said second identifier from said each base station, wherein said communication and said termination process are capable of taking place within a single mobile communication system.

21. A mobile communication system as claimed in claim 20, wherein the transmitter/receiver of each base station further comprises signal transmitting means for transmitting to said mobile unit, when said communication is terminated at said each base station, a station channel disconnection signal carrying a termination identifier indicative of, as one of said area identifiers, the cell set comprising one of the cells in which said mobile unit is present during the termination process of said communication.

22. A mobile communication system as claimed in claim 20, wherein the transmitter/receiver of said mobile unit further comprises signal transmitting means for transmitting to said each base station, during the termination process of said communication which is initiated by said mobile unit, a mobile channel disconnection signal which makes said each base station transmit to said central office and to said mobile unit a station channel disconnection signal carrying a termination identifier indicative of, as one of said area identifiers, the cell set comprising one of the cells in which said mobile unit is present during the termination process of said communication.

23. A method of mobile communication in a system including a central office, a plurality of base stations connected to said central office and collectively having an overall service area divided into cell sets which are identified by respective area identifiers and each of which is subdivided into at least one cell, the cells of said cell sets being in one-to-one correspondence to said base stations, and a mobile unit movable in said overall service area and capable of carrying out communication in said system with one of said base stations while present in one of the cells that corresponds to said one of the base stations, said method comprising the steps of:

a) during said communication in said system, transferring only a first identifier of said area identifiers from a memory of said each base station to a memory of a different station of said base stations when said mobile unit moves from a first cell of the cells to a second cell of the cells, said first cell being in the cell set identified by said first identifier and being in correspondence to said each base station, said second cell being in the cell set identified by a second identifier of said area identifiers and being in correspondence to said different station;

b) during a termination process of said communication in said system, transmitting said second identifier to at least one of said central office and said mobile unit if said second identifier is different from said first identifier, the transmitting of said second identifier only being done during said termination process and not during other portions of said communication; and c) updating the memory of the different station to said second identifier when supplied with said second identifier from said each base station, wherein said communication and said termination process are capable of taking place within a single mobile communication system.

24. A method as claimed in claim 23, further comprising the step of transmitting to said mobile unit, when said communication is terminated at said each base station, a station channel disconnection signal carrying a termination identifier indicative of, as one of said area identifiers, the cell set comprising one of the cells in which said mobile unit is present during the termination process of said communication.

25. A method as claimed in claim 23, further comprising the step of transmitting, by said mobile unit to said each base station, during the termination process of said communication which is initiated by said mobile unit, a mobile channel disconnection signal which makes said each base station transmit to said central office and to said mobile unit a station channel disconnection signal carrying a termination identifier indicative of, as one of said area identifiers, the cell set comprising one of the cells in which said mobile unit is present during the termination process of said communication.

* * * * *